United States Patent
Shivamoggi et al.

(10) Patent No.: US 10,547,629 B2
(45) Date of Patent: Jan. 28, 2020

(54) DETECTING MALICIOUS NETWORK ACTIVITY USING TIME SERIES PAYLOAD DATA

(71) Applicant: Rapid7, Inc., Boston, MA (US)

(72) Inventors: Vasudha Shivamoggi, Cambridge, MA (US); Oliver Keyes, Seattle, WA (US)

(73) Assignee: Rapid7, Inc., Boston, MA (US)

( * ) Notice: Subject to any disclaimer, the term of this patent is extended or adjusted under 35 U.S.C. 154(b) by 173 days.

(21) Appl. No.: 15/803,805

(22) Filed: Nov. 5, 2017

(65) Prior Publication Data

US 2019/0141066 A1    May 9, 2019

(51) Int. Cl.
H04L 29/06      (2006.01)
G06F 21/56      (2013.01)
G06F 21/53      (2013.01)

(52) U.S. Cl.
CPC .......... *H04L 63/1425* (2013.01); *G06F 21/53* (2013.01); *G06F 21/56* (2013.01); *G06F 21/566* (2013.01); *H04L 63/145* (2013.01); *H04L 63/1408* (2013.01); *H04L 63/1416* (2013.01); *H04L 63/1466* (2013.01)

(58) Field of Classification Search
CPC ............... H04L 63/1416; H04L 63/145; H04L 63/1425; H04L 63/1408; H04L 63/1466; G06F 2009/45587; G06F 21/53; G06F 21/554; G06F 21/552; G06F 21/56; G06F 21/566; G06F 21/55; G06F 21/564
See application file for complete search history.

(56) References Cited

U.S. PATENT DOCUMENTS

| | | | |
|---|---|---|---|
| 9,800,608 B2 * | 10/2017 | Korsunsky | G06F 21/55 |
| 10,356,106 B2 * | 7/2019 | Engel | H04L 63/1408 |
| 10,362,149 B2 * | 7/2019 | Biederman | H04L 47/625 |
| 2009/0082997 A1 * | 3/2009 | Tokman | G06K 9/6224 |
| | | | 702/179 |
| 2013/0097706 A1 * | 4/2013 | Titonis | G06F 21/56 |
| | | | 726/24 |
| 2016/0219067 A1 * | 7/2016 | Han | H04L 63/1425 |
| 2017/0214702 A1 * | 7/2017 | Moscovici | H04L 63/1416 |
| 2018/0069885 A1 * | 3/2018 | Patterson | H04L 63/14 |
| 2018/0077175 A1 * | 3/2018 | DiValentin | H04L 63/1416 |

* cited by examiner

*Primary Examiner* — Saleh Najjar
*Assistant Examiner* — Feliciano S Mejia
(74) *Attorney, Agent, or Firm* — Danielson Legal LLC (57) ABSTRACT

Methods and systems for detecting malicious network activity. The method may include analyzing payload data relating to activity on one or more virtual security appliances, grouping related payloads, and analyzing a time series dataset describing the groupings to identify anomalous payloads.

18 Claims, 7 Drawing Sheets

DETECTING MALICIOUS NETWORK ACTIVITY USING TIME SERIES PAYLOAD DATA

TECHNICAL FIELD

Embodiments described herein generally relate to systems and methods for detecting malicious payloads.

BACKGROUND

Existing techniques for detecting malicious network activity generally rely on rules-based systems and processes in which network administrators implement rules to detect known threats. For example, currently available tools such as BRO use hard-coded rules to compare suspected malicious network activity with previous known incidents.

These techniques are inherently reactive and only mitigate or otherwise address threats that have already been discovered. At this point, the malicious activity may have already caused considerable harm to the affected network.

A need exists, therefore, for methods and systems that are more proactive in identifying malicious network activity.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method for detecting malicious network activity. The method includes receiving, using an interface, at least one payload relating to an attack on a virtual security appliance, extracting, using an analysis module executing instructions stored on a memory, at least one feature related to the at least one payload; sorting, using the analysis module, the at least one payload into at least one cluster based on the at least one extracted feature; generating, using the analysis module, a time series dataset from the at least one cluster; and identifying, using the analysis module, at least one payload from the generated time series dataset.

In some embodiments, the generated time series dataset comprises population sizes for each of the at least one cluster and identifying the at least one payload includes identifying at least one cluster with an outlier population size based on the dataset.

In some embodiments, the generated time series dataset comprises a value of a distance function applied to each of the at least one cluster and identifying the at least one payload includes identifying at least one cluster with an outlier distance function value based on the dataset.

In some embodiments, the generated time series dataset comprises a value of a function applied to each of the at least one cluster that determines the distance between at least one payload and the centroid of the at least one cluster and identifying the at least one payload includes identifying at least one payload with an outlier function value based on the dataset.

In some embodiments, the generated time series dataset comprises a value of a diffuse function applied to each of the at least one cluster and identifying the at least one payload includes identifying at least one cluster with an outlier diffuse value based on the dataset.

In some embodiments, sorting the at least one payload into at least one cluster includes applying a k-means function to the at least one payload and sorting the at least one payload into at least one cluster is based on the result of the application of the k-means function.

In some embodiments, sorting the at least one payload into at least one cluster includes sorting the at least one payload into a predetermined number of clusters.

In some embodiments, the at least one extracted feature indicates whether the payload is malicious.

In some embodiments, the at least one extracted feature is related to the number or frequency of payload headers.

According to another aspect, embodiments relate to a system for detecting malicious network activity. The system includes an interface configured to receive at least one payload relating to an attack on a virtual security appliance; a memory; and an analysis module configured to execute instructions stored on the memory to: extract at least one feature related to the at least one payload; sort the at least one payload into at least one cluster based on the at least one extracted feature; generate a time series dataset from the at least one cluster; and identify at least one payload from the generated time series dataset.

In some embodiments, the generated time series dataset comprises population sizes for each of the at least one cluster and the analysis module identifies the at least one payload by identifying at least one cluster with an outlier population size based on the dataset.

In some embodiments, the generated time series dataset comprises a value of a distance function applied to each of the at least one cluster, and the analysis module identifies the at least one payload by identifying at least one cluster with an outlier distance function value based on the dataset.

In some embodiments, the generated time series dataset comprises a value of a function applied to each of the at least one cluster that determines the distance between the at least one cluster and the centroid of the at least one cluster and the analysis module identifies the at least one payload by identifying at least one cluster with an outlier function value based on the dataset.

In some embodiments, the generated time series dataset comprises a value of a diffuse function applied to each of the at least one cluster and identifying the at least one payload includes identifying at least one cluster with an outlier diffuse value based on the dataset.

In some embodiments, the analysis module is configured to sort the at least one payload into at least one cluster by applying a k-means function to the at least one payload, and sorting the at least one payload into at least one cluster is based on the result of the application of the k-means function.

In some embodiments, the analysis module is configured to sort the at least one payload into a predetermined number of clusters.

In some embodiments, the at least one extracted feature indicates whether the payload is malicious.

In some embodiments, the at least one extracted feature is related to the number or frequency of payload headers.

BRIEF DESCRIPTION OF DRAWINGS

Non-limiting and non-exhaustive embodiments of the invention are described with reference to the following figures, wherein like reference numerals refer to like parts throughout the various views unless otherwise specified.

DETAILED DESCRIPTION

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

In view of the disadvantages of existing techniques for detecting malicious network activity discussed above, features of various embodiments described herein use payload clustering to identify qualitatively new cyber attacks based on payload behavior. This technique makes it possible to detect changes in the nature of attempted attacks in a way that extends standard time-series approaches. For example this technique can detect when a new family of payloads appears or when an existing family increases rapidly in size.

Accordingly, payload clustering detects changes over time with respect to the nature of attempted intrusions, access attempts, scans, attacks, or the like (hereinafter "attacks"). This is opposed to existing techniques that rely on quantitative measurements such as those based on size or target(s).

The payload clustering techniques in accordance with various embodiments described herein may generate a time series dataset from a set of payloads. These processes are carried out in three stages. First, features are extracted from data that describes the payload. Second, one or more clustering procedures identify how the payloads group together.

Third, properties of the set of clusters are tracked such that any abrupt changes in the clusters are flagged for review.

Figure 1:
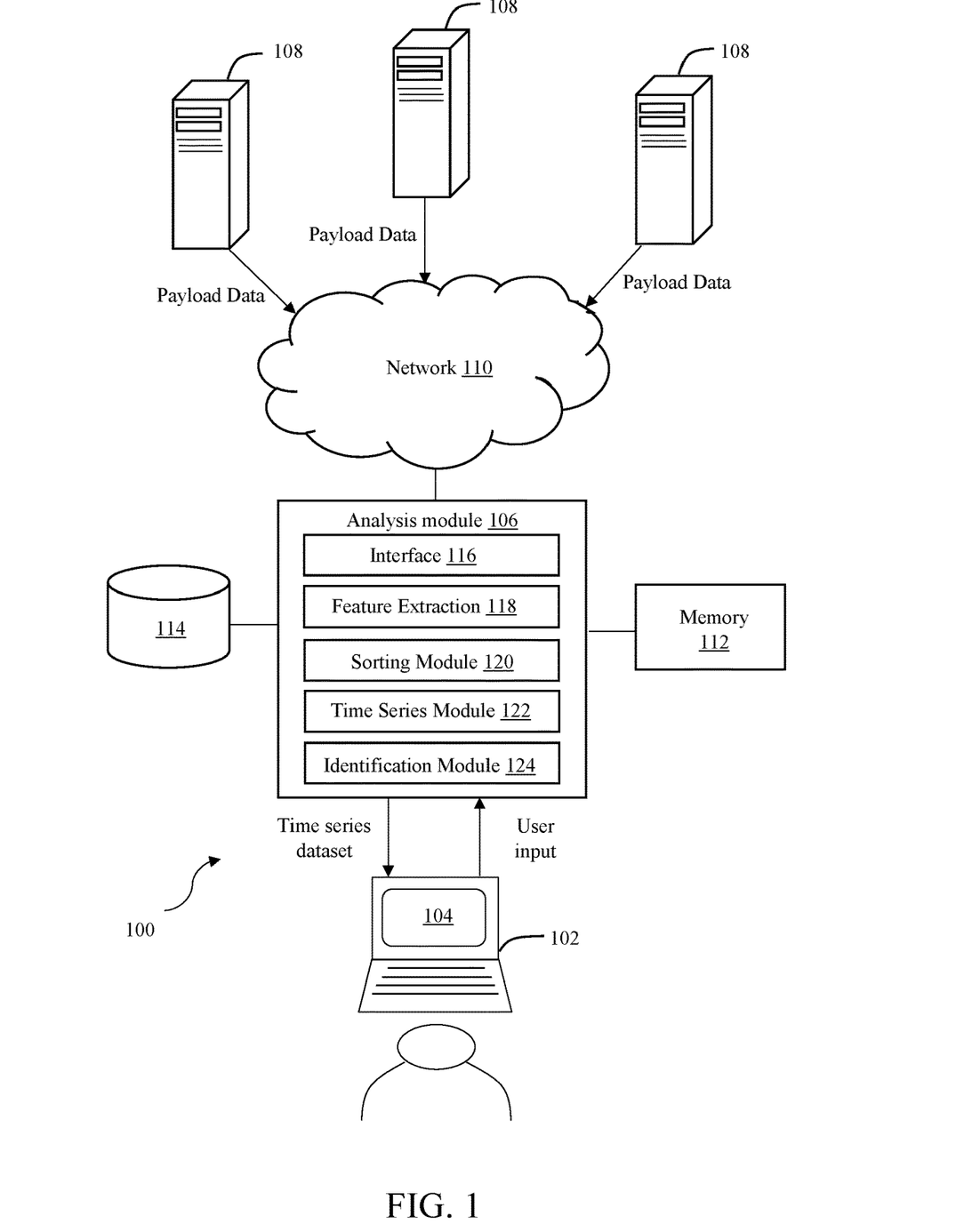
FIG. 1 illustrates a system for detecting malicious network activity in accordance with one embodiment.

FIG. 1 illustrates a system 100 for detecting malicious payloads in accordance with one embodiment. The system 100 may include a user device 102 executing a user interface 104, and an analysis module 106 that is in communication with one or more virtual security appliances 108 over one or more networks 110. The analysis module 106 may also be in communication with memory 112 and one or more databases 114.

The user device 102 may be any hardware device capable of executing the user interface 104. The user device 102 may be configured as a laptop, PC, tablet, mobile device, or the like as long as it can execute and present the user interface 104 to a user.

The user interface 104 may enable a user such as a network administrator or security personnel to view data regarding the payloads. The user interface 104 may also enable the user to provide input such as parameters relating to network and payload analysis.

The analysis module 106 may be any hardware device capable of analyzing the payload data. The analysis module 106 may be a microprocessor, a field programmable gate array (FPGA), an application-specific integrated circuit (ASIC), or other similar device.

In some embodiments, such as those relying on one or more ASICs, the functionality described as being provided in part via software may instead be configured into the design of the ASICs and, as such, the associated software may be omitted. The analysis module 106 may be configured as part of the device 102 on which the user interface 104 executes, such as a laptop, or may be located at some remote location.

The virtual security appliance(s) 108 may include one or more honeypot devices. These appliances 108 are deliberately vulnerable servers that may provide a deep view into indiscriminate activity on a network.

The appliances 108 may collect payloads that provide a rich and diverse dataset. The analysis module 106 can mine this dataset for detailed information regarding the nature of these attacks. Specifically, the components of the analysis module 106 may analyze the received data to determine when new, previously unseen attacks appear and flag any such attacks.

The network(s) 110 may link the various devices with various types of network connections. The network(s) 110 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34 bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network or networks 110 may also comprise, include, or interface to any one or more of a Wireless Application Protocol (WAP) link, a Wi-Fi link, a microwave link, a General Packet Radio Service (GPRS) link, a Global System for Mobile Communication G(SM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based link.

The memory 112 may be L1, L2, L3 cache or RAM memory configurations. The memory 112 may include non-volatile memory such as flash memory, EPROM, EEPROM, ROM, and PROM, or volatile memory such as static or dynamic RAM, as discussed above. The exact configuration/type of memory 112 may of course vary as long as instructions for at least analyzing the payload data can be executed by the analysis module 106 to accomplish the features of various embodiments described herein.

The database(s) 114 may store data regarding previously identified attacks and payloads. The database 114 may store results of the time series analyses, for example.

The analysis module 106 may include or otherwise be in connection with an interface 116, a feature extraction module 118, a sorting module 120, a time series module 122, and an identification module 124. The interface 116 may be configured to receive one or more payloads that include data related to an attack on a virtual security appliance 108.

The feature extraction module 118 may carry out the first step in the analysis. The feature extraction module 118 extracts features from the payload data that may be useful in detecting the emergence of new types of attacks.

In accordance with various embodiments, the feature extraction module 118 may extract two types of features referred to herein as "flags" and "shapes." The flag features distinguish between malicious and benign payloads. For example, the flag features may detect the presence of code injection in the Content Type header that may indicate whether a payload is malicious in nature.

The shape features consider items such as the number or relative frequency of headers and do not necessarily indicate malicious activity. Rather, the shape features are used to establish a baseline for what payloads look like to provide a background against which to detect outliers. Accordingly, the payloads may be represented by numbers.

The sorting module 120 may execute instructions stored in memory 112 to implement a clustering algorithm to discover natural groupings present in the dataset. The sorting module 120 may run a k-means procedure and optimize over the number of clusters. The resulting set of clusters may indicate what the landscape of payload families looks like.

Each cluster may consist of payloads that are more similar to each other in some aspect than they are compared with payloads assigned to other clusters. This clustering step may be performed at certain time intervals, such as at the end of each day.

The time series module 122 may generate a time series dataset that tracks the clusters over time at certain intervals. A user may configure the time series module 122 to generate the time series dataset at predetermined periods of the day or at the end of each day, for example.

The identification module 124 may track the clusters to identify anomalies. In various embodiments described herein, the identification module 124 focuses on properties that are more robust to noise from the clustering algorithms and more sensitive to the types of outliers that would be expected from new, emerging attacks.

Figure 2:
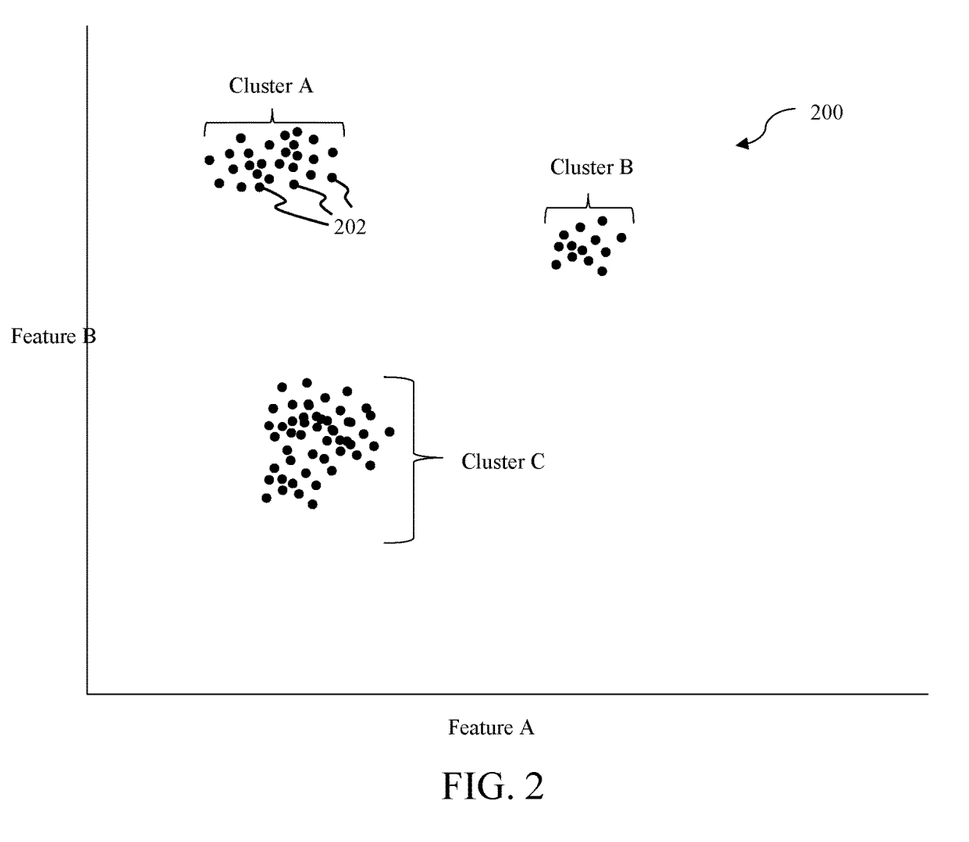
FIG. 2 illustrates a graphical representation of payloads sorted into clusters in accordance with one embodiment.

FIG. 2 illustrates a graphical representation 200 of payload clusters. As seen in graph 200, a payload that has features A and B is represented as small black circles 202. Payloads that exhibit similar features to others may be grouped together in clusters such as Clusters A, B, and C. In other words, payloads that are grouped in Cluster A are more similar to each other than a payload grouped in Cluster B, at least with respect to features A and B.

The time series module 122 may generate or otherwise update the graph 200 at certain intervals. These intervals may be at the end of each day (e.g., to show the new payloads that were detected that day), hour, week, month, or the like. Additionally or alternatively, the time series module 122 may generate or update the graph 200 after it detects a certain number of payloads.

The identification module 124 may identify one or more anomalies by using a number of criteria. In some embodiments, the identification module 124 may identify one or more anomalies by considering cluster population (i.e., the number of payloads in each cluster).

Figure 3:
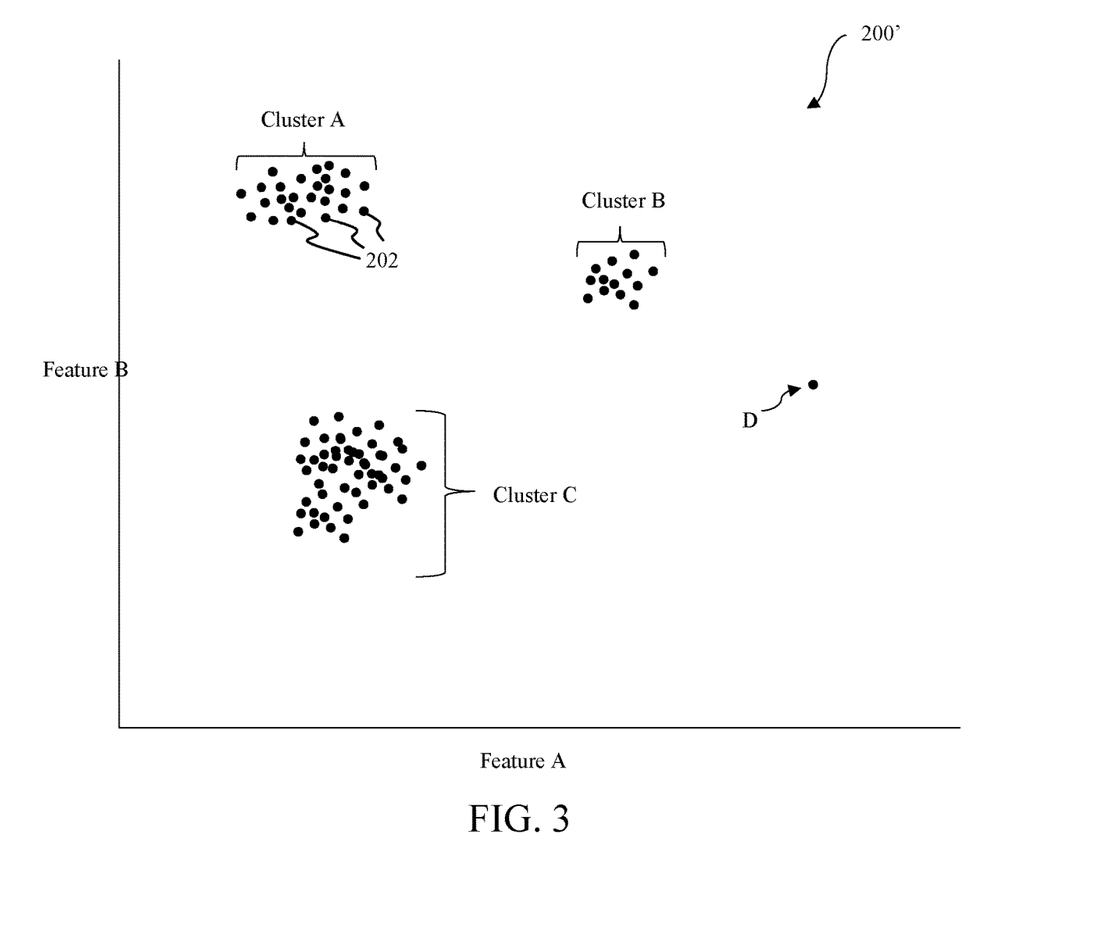
FIG. 3 illustrates the graphical representation of FIG. 2 with a new detected payload in accordance with one embodiment.

For example, a detected payload may be so different from other payloads in existing clusters that it forms its own cluster. FIG. 3 illustrates an updated graphical representation 200' of the graph 200 of FIG. 2 that now includes payload D. The identification module 124 may notice a sharp drop in the smallest population from some baseline quantity down to, for example, one (representing this new payload D). This may trigger a flag or notification that this new payload D should be elevated for further examination.

Accordingly, the value in this clustering approach is that the identification module 124 can detect these small events that are anomalous enough to warrant investigation. However, these small events would not register with other techniques such as volume-based detection techniques.

In other embodiments, the identification module 124 may detect one or more anomalies by applying a distance function to each cluster, and then identifying a cluster with an outlier distance function value. For example, FIG. 4 illustrates a graphical representation 400 of clusters D, E, and F.

The applied distance function may detect or otherwise recognize clusters that are farthest away from others. In FIG. 4, for example, clusters D and E are close to each other, but cluster F is shown as much further away than either cluster D or E. The distance function may therefore calculate distance DE (the distance from cluster D to cluster E), DF (the distance from cluster D to cluster F), and distance EF (the distance from cluster E to cluster F). If the distance between two clusters is greater than some threshold, one of or both of the clusters can be flagged for further review. The distance may be measured from, for example, the payloads that are closest to each other from different clusters, payloads that are farthest from each other from different clusters, etc.

Figure 4:
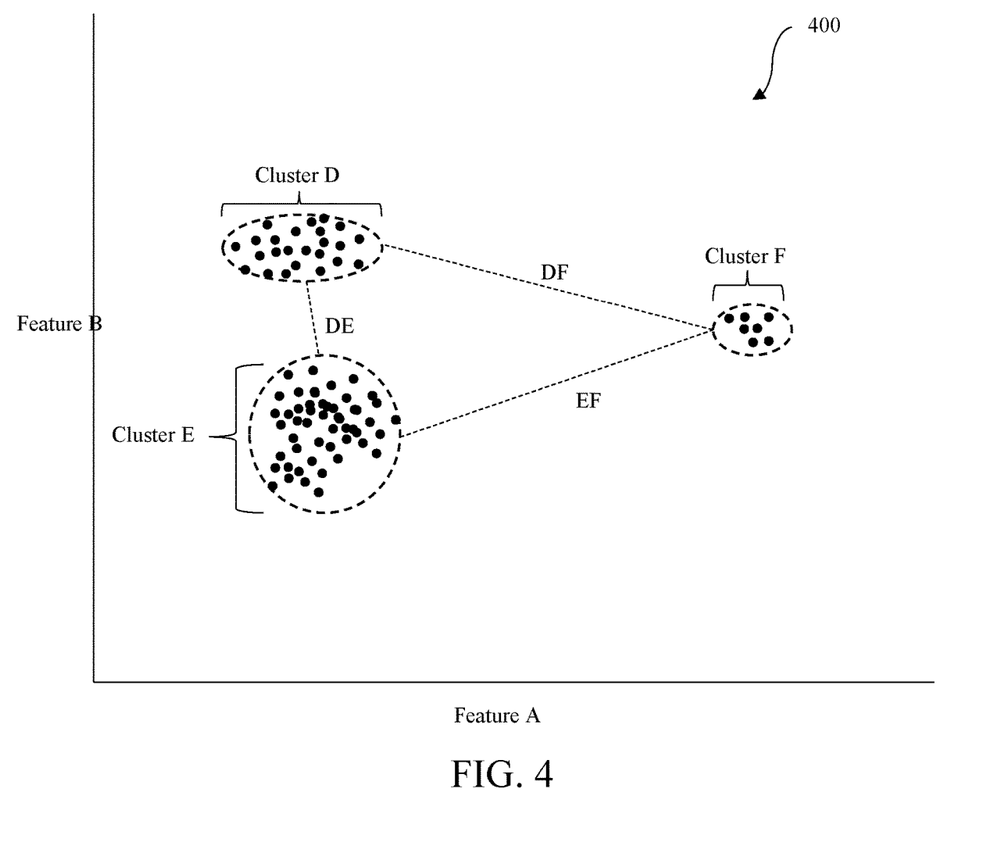
FIG. 4 illustrates a graphical representation of clusters to which a distance function is applied in accordance with one embodiment.

Referring to FIG. 4, the identification module 124 may determine that distance DF is significantly more than distance DE. The identification module 124 may also determine that distance EF is significantly more than distance DE. From this information, the identification module 124 may determine that cluster F is an outlier and therefore includes anomalous payloads that should be flagged for further review.

Figure 5:
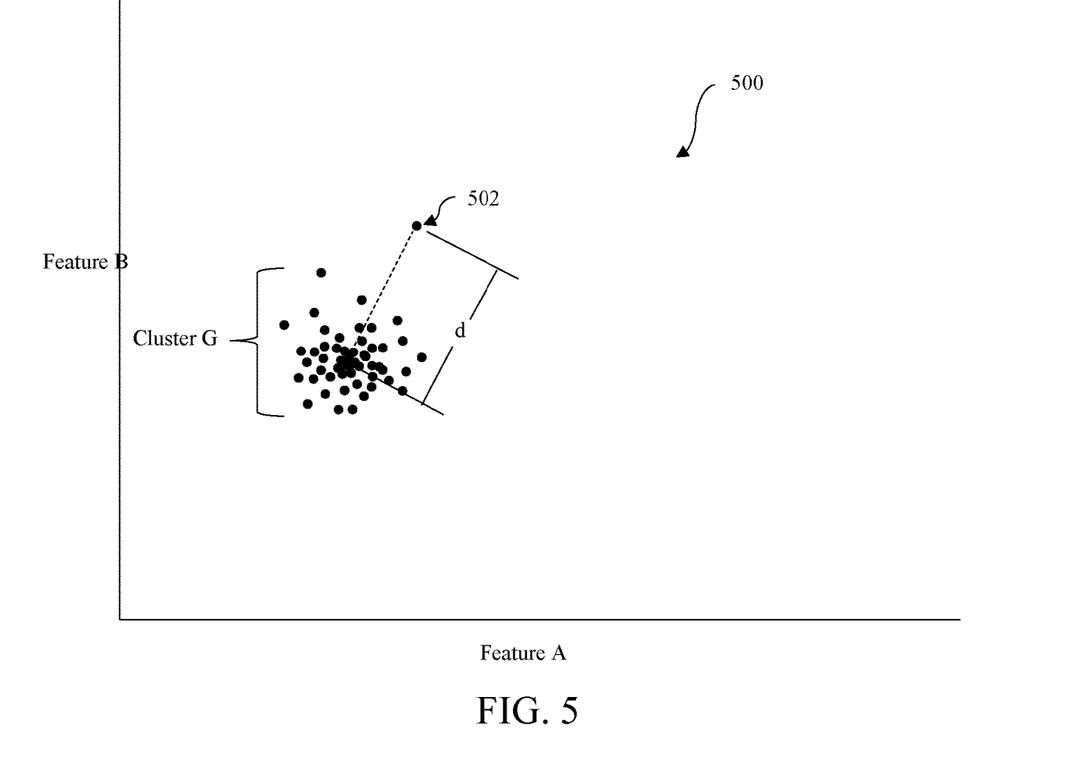
FIG. 5 illustrates a graphical representation of clusters to which a payload-cluster centroid distance function is applied in accordance with one embodiment.

In other embodiments, the identification module 124 may similarly apply a function that determines the distance between a payload(s) and the centroid of its cluster. FIG. 5, for example, presents a graphical representation 500 of cluster G in accordance with one embodiment. The identification module 124 may apply this function to calculate the distance d between the centroid of this cluster G and a payload 502, which may be the furthest payload from the centroid of cluster G. In the context of the present application, the term "centroid" may refer to a portion of a cluster in which the majority of the payloads are concentrated.

The identification module 124 may flag a payload whose distance from its cluster's centroid is greater than some threshold. Similarly, the identification module 124 may flag an entire cluster if the cluster has one or more payloads at a distance from the centroid that is greater than some threshold.

Figure 6:
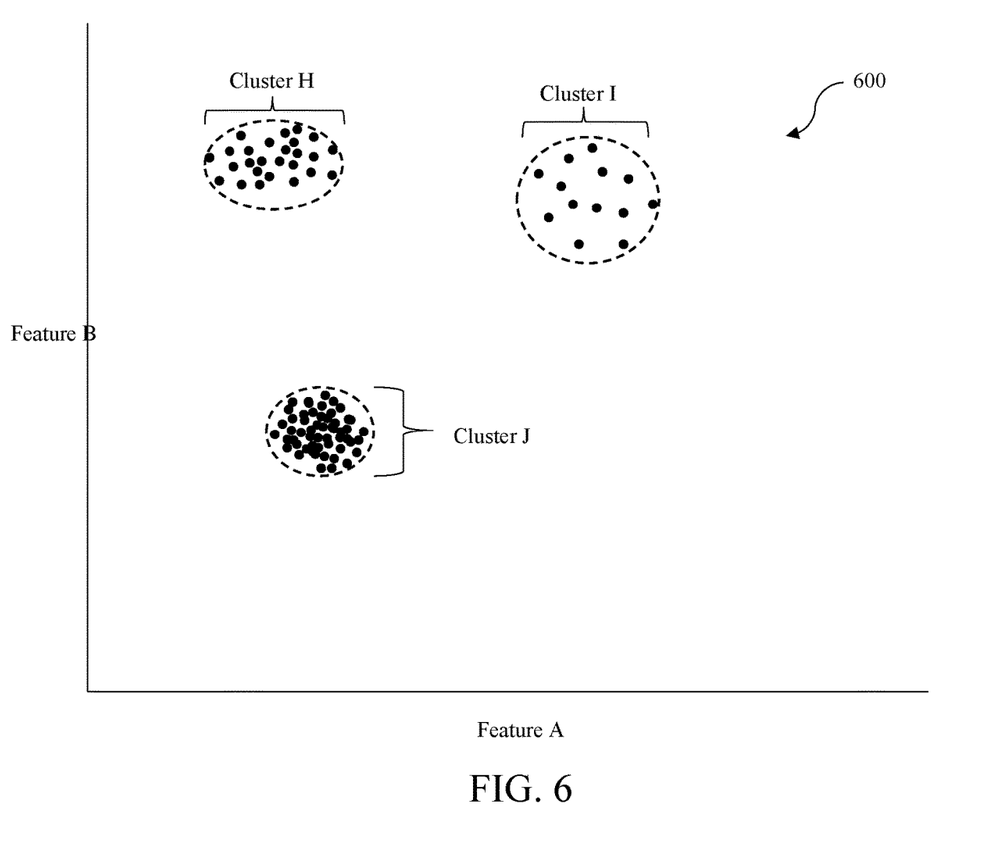
FIG. 6 illustrates a graphical representation of clusters to which a diffuse function is applied in accordance with one embodiment.

In other embodiments, the identification module 124 may apply a diffuse function to one or more clusters to identify at least one cluster with an outlier diffuse value. In the context of the present application, the term "diffuse" or "diffusivity" may refer to how diffuse or "spread out" payloads are within a cluster.

For example, FIG. 6 illustrates a graphical representation 600 of clusters H, I, and J. Each cluster is highlighted by a dashed circle, representing an area the cluster covers. As seen in FIG. 6, cluster J would have a low diffuse value meaning that the payloads are close together in a relatively small pace. Cluster I, on the other hand, would have a high diffuse value meaning that the payloads are spaced apart. The identification module 124 may track the clusters and flag those clusters with the highest diffuse values for further review.

Figure 7:
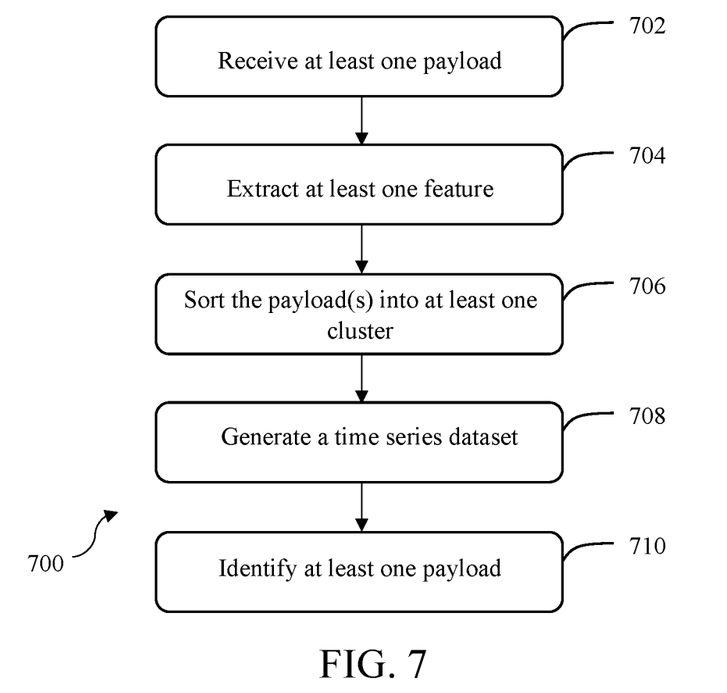
FIG. 7 depicts a flowchart of a method for detecting malicious network activity in accordance with one embodiment.

FIG. 7 depicts a flowchart of a method 700 for detecting malicious network activity in accordance with one embodiment. Step 702 involves receiving, using an interface, at least one payload relating to an attack on a virtual security appliance. The interface may be part of analysis module such as the analysis module 106 of FIG. 1

The virtual security appliance(s) may be similar to the virtual security appliances 108 of FIG. 1 and may be deliberately vulnerable servers (i.e., honeypot devices). The purpose of these virtual security appliances may be to appear vulnerable or attractive to malicious actors to entice them to scan, access, or attack the appliance.

Data regarding these malicious scans/attacks (i.e., payloads) may be communicated to an analysis module for further analysis. Step 704 involves extracting, using an analysis module executing instructions stored on a memory, at least one feature related to the at least one payload. Specifically, a feature extraction module such as the feature extraction module 118 of FIG. 1 may extract features that describe the payload. The features may be similar to those discussed previously.

Step 706 involves sorting, using the analysis module, the at least one payload into at least one cluster based on the at least one extracted feature. Specifically, the sorting module 120 of FIG. 1 may sort payloads into clusters such as those shown in FIGS. 2-6. The sorting module may group the payloads into clusters based on whether or not a payload possesses one or more features (as well as the quantity of said features the payloads possess, for example).

Step 708 involves generating, using the analysis module, a time series dataset from the at least one cluster. Specifically, the times series module 122 of FIG. 1 may generate a summary of all payloads detected at certain intervals discussed above. The time series module 122 may output the cluster data using a graphical representation such as those shown in FIGS. 2-6 or as a sequence of real or integer numbers that describes the clusters and/or the underlying payload data. These representations may be updated periodically, and may be presented to an operator or the like via a user device 102.

Step 710 involves identifying, using the analysis module, at least one payload from the generated time series dataset. Specifically, the identification module 124 may identify one or more payloads from the dataset for further review. For example, if an anomalous payload is detected using one or more of the functions described above (as well as any other function or technique), it may indicate that the payload should be elevated for further review.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method for detecting malicious network activity, the method comprising:
    receiving, using an interface, at least one payload relating to an attack on a virtual security appliance;
    extracting, using an analysis module executing instructions stored on a memory, at least one feature related to the at least one payload;
    sorting, using the analysis module, the at least one payload into at least one cluster based on the at least one extracted feature;
    generating, using the analysis module, a time series dataset from the at least one cluster; and
    identifying, using the analysis module, at least one payload from the generated time series dataset that is different from the at least one payload sorted into the at least one cluster such that the different at least one payload forms its own cluster and is therefore anomalous.

2. The method of claim 1 wherein the generated time series dataset comprises population sizes for each of the at least one cluster and identifying the at least one payload includes identifying at least one cluster with an outlier population size based on the dataset.

3. The method of claim 1 wherein the generated time series dataset comprises a value of a distance function applied to each of the at least one cluster and identifying the at least one payload includes identifying at least one cluster with an outlier distance function value based on the dataset.

4. The method of claim 1 wherein the generated time series dataset comprises a value of a function applied to each of the at least one cluster that determines the distance between at least one payload and the centroid of the at least one cluster and identifying the at least one payload includes identifying at least one payload with an outlier function value based on the dataset.

5. The method of claim 1 wherein the generated time series dataset comprises a value of a diffuse function applied to each of the at least one cluster and identifying the at least one payload includes identifying at least one cluster with an outlier diffuse value based on the dataset.

6. The method of claim 1 wherein sorting the at least one payload into at least one cluster includes applying a k-means function to the at least one payload and sorting the at least one payload into at least one cluster is based on the result of the application of the k-means function.

7. The method of claim 1 wherein sorting the at least one payload into at least one cluster includes sorting the at least one payload into a predetermined number of clusters.

8. The method of claim 1 wherein the at least one extracted feature indicates whether the payload is malicious.

9. The method of claim 1 wherein the at least one extracted feature is related to the number or frequency of payload headers.

10. A system for detecting malicious network activity, the system including:
    an interface configured to receive at least one payload relating to an attack on a virtual security appliance;
    a memory; and an analysis module configured to execute instructions stored on the memory to:
extract at least one feature related to the at least one payload;
sort the at least one payload into at least one cluster based on the at least one extracted feature;
generate a time series dataset from the at least one cluster; and
identify at least one payload from the generated time series dataset that is different from the at least one payload sorted into the at least one cluster such that the different at least one payload forms its own cluster and is therefore anomalous.

11. The system of claim 10 wherein the generated time series dataset comprises population sizes for each of the at least one cluster and the analysis module identifies the at least one payload by identifying at least one cluster with an outlier population size based on the dataset.

12. The system of claim 10 wherein the generated time series dataset comprises a value of a distance function applied to each of the at least one cluster, and the analysis module identifies the at least one payload by identifying at least one cluster with an outlier distance function value based on the dataset.

13. The system of claim 10 wherein the generated time series dataset comprises a value of a function applied to each of the at least one cluster that determines the distance between the at least one cluster and the centroid of the at least one cluster and the analysis module identifies the at least one payload by identifying at least one cluster with an outlier function value based on the dataset.

14. The system of claim 10 wherein the generated time series dataset comprises a value of a diffuse function applied to each of the at least one cluster and identifying the at least one payload includes identifying at least one cluster with an outlier diffuse value based on the dataset.

15. The system of claim 10 wherein the analysis module is configured to sort the at least one payload into at least one cluster by applying a k-means function to the at least one payload, and sorting the at least one payload into at least one cluster is based on the result of the application of the k-means function.

16. The system of claim 10 wherein the analysis module is configured to sort the at least one payload into a predetermined number of clusters.

17. The system of claim 10 wherein the at least one extracted feature indicates whether the payload is malicious.

18. The system of claim 10 wherein the at least one extracted feature is related to the number or frequency of payload headers.

* * * * *